United States Patent
Gustin et al.

(10) Patent No.: US 10,783,026 B2
(45) Date of Patent: Sep. 22, 2020

(54) APPARATUS AND METHOD FOR DETECTING NETWORK PROBLEMS ON REDUNDANT TOKEN BUS CONTROL NETWORK USING TRAFFIC SENSOR

(71) Applicant: Honeywell International Inc., Morris Plains, NJ (US)

(72) Inventors: Jay W. Gustin, Scottsdale, AZ (US); Steven Roby, Glendale, AZ (US)

(73) Assignee: Honeywell International Inc., Morris Plains, NJ (US)

( * ) Notice: Subject to any disclaimer, the term of this patent is extended or adjusted under 35 U.S.C. 154(b) by 156 days.

(21) Appl. No.: 15/897,300

(22) Filed: Feb. 15, 2018

(65) Prior Publication Data
US 2019/0250976 A1 Aug. 15, 2019

(51) Int. Cl.
G06F 11/00 (2006.01)
G06F 11/07 (2006.01)
G06F 13/40 (2006.01)

(52) U.S. Cl.
CPC ...... *G06F 11/0769* (2013.01); *G06F 11/0706* (2013.01); *G06F 11/076* (2013.01); *G06F 13/4004* (2013.01)

(58) Field of Classification Search
CPC ...... G06F 11/2002; G05B 2219/25165; G05B 2219/31183; G05B 2219/31245
See application file for complete search history.

(56) References Cited

U.S. PATENT DOCUMENTS

| | | | | | |
|---|---|---|---|---|---|
| 3,701,109 | A | * | 10/1972 | Peters | G06F 9/4825 710/244 |
| 4,058,681 | A | * | 11/1977 | Imaizumi | H04L 12/417 370/245 |
| 4,137,522 | A | * | 1/1979 | Stein | G08C 15/12 340/4.21 |
| 4,227,178 | A | * | 10/1980 | Gergaud | H04L 12/403 340/9.1 |

(Continued)

FOREIGN PATENT DOCUMENTS

EP 0488501 A2 6/1992

OTHER PUBLICATIONS

"Packet analyzer," Wikipedia, Jan. 14, 2016, 4 pages.
(Continued)

*Primary Examiner* — Christopher S McCarthy

(57) ABSTRACT

An apparatus includes an interface configured to obtain data associated with multiple cables coupled to or forming a part of a redundant token bus control network. The apparatus also includes a traffic detector configured to determine whether valid data traffic is being received over the cables from the redundant token bus control network based on the data. The apparatus further includes at least one processing device configured to determine whether one or more of the cables has experienced a network fault or a return from a network fault based on the determination of whether valid data traffic is being received over the cables. The at least one processing device is also configured, in response to determining that one or more of the cables has experienced a network fault or a return from a network fault, to generate a notification that identifies the apparatus and the one or more cables and output the notification.

16 Claims, 6 Drawing Sheets

(56) References Cited

U.S. PATENT DOCUMENTS

| | | | | |
|---|---|---|---|---|
| 4,375,639 A | * | 3/1983 | Johnson, Jr. | G06F 13/374 710/114 |
| 4,638,313 A | * | 1/1987 | Sherwood, Jr. | G06F 12/0661 340/9.16 |
| 4,644,456 A | | 2/1987 | Lydell | |
| 4,649,535 A | * | 3/1987 | Ulug | H04L 12/417 370/451 |
| 4,667,323 A | * | 5/1987 | Engdahl | H04L 12/417 370/451 |
| 4,680,581 A | * | 7/1987 | Kozlik | H04L 12/40195 340/3.44 |
| 4,682,326 A | * | 7/1987 | Ulug | H04L 12/417 370/257 |
| 4,707,830 A | * | 11/1987 | Ulug | H04L 12/417 370/454 |
| 4,709,364 A | * | 11/1987 | Hasegawa | H04L 12/433 370/455 |
| 4,715,031 A | * | 12/1987 | Crawford | H04L 12/4135 370/462 |
| 4,745,598 A | * | 5/1988 | Ulug | H04L 43/00 370/455 |
| 4,747,100 A | * | 5/1988 | Roach | H04L 12/417 370/452 |
| 4,779,092 A | * | 10/1988 | Takao | H04L 12/417 340/9.12 |
| 4,796,022 A | * | 1/1989 | Schenkel | G06F 13/366 340/2.8 |
| 4,847,834 A | * | 7/1989 | Bryant | H04L 12/40013 370/449 |
| 4,870,571 A | * | 9/1989 | Frink | G06F 15/161 709/224 |
| 4,949,083 A | * | 8/1990 | Hirabayashi | H04L 12/417 370/450 |
| 4,949,337 A | * | 8/1990 | Aggers | H04L 12/417 370/451 |
| 4,973,954 A | * | 11/1990 | Schwarz | H02J 13/00 307/3 |
| 4,977,499 A | * | 12/1990 | Banning | G06F 9/546 709/230 |
| 5,025,491 A | * | 6/1991 | Tsuchiya | H04L 29/00 340/9.1 |
| 5,053,946 A | * | 10/1991 | Jain | H04L 12/433 370/452 |
| 5,119,226 A | * | 6/1992 | Allen | H04B 10/1149 398/100 |
| 5,140,586 A | * | 8/1992 | Kloper | H04L 12/417 370/216 |
| 5,220,653 A | | 6/1993 | Miro | |
| 5,245,460 A | * | 9/1993 | Allen | H04B 10/1149 398/121 |
| 5,247,620 A | * | 9/1993 | Fukuzawa | H04L 12/4625 370/402 |
| 5,283,571 A | * | 2/1994 | Yang | H04L 41/00 340/9.16 |
| 5,327,534 A | * | 7/1994 | Hutchison | H04L 12/433 370/245 |
| 5,404,134 A | * | 4/1995 | Jinzaki | H04L 12/433 370/245 |
| 5,418,966 A | * | 5/1995 | Madduri | G06F 3/1454 710/200 |
| 5,444,695 A | * | 8/1995 | Copley | H04L 12/433 370/452 |
| 5,539,394 A | * | 7/1996 | Cato | G06K 7/0008 235/385 |
| 5,630,113 A | * | 5/1997 | Hayssen, III | H04J 3/0626 713/503 |
| 5,630,128 A | | 5/1997 | Farrell et al. | |
| 5,970,236 A | | 10/1999 | Galloway et al. | |
| 6,442,634 B2 | | 8/2002 | Bronson et al. | |
| 6,519,605 B1 | | 2/2003 | Gilgen et al. | |
| 6,779,182 B1 | | 8/2004 | Zolnowsky | |
| 6,934,876 B1 | * | 8/2005 | Holeman, Sr. | H04L 29/12254 370/399 |
| 7,002,947 B1 | * | 2/2006 | McFarland | H04W 74/08 370/348 |
| 7,047,319 B2 | * | 5/2006 | Denecheau | H04L 12/413 370/404 |
| 7,047,321 B1 | | 5/2006 | Endo | |
| 7,234,139 B1 | | 6/2007 | Feinberg | |
| 7,324,468 B2 | * | 1/2008 | Fischer | H04L 12/12 370/311 |
| 7,362,740 B2 | * | 4/2008 | Fredriksson | G06F 1/14 370/345 |
| 7,400,615 B2 | * | 7/2008 | Holeman, Sr. | H04L 29/12113 370/348 |
| 7,565,631 B1 | | 7/2009 | Banerjee et al. | |
| 7,590,982 B1 | | 9/2009 | Weissman | |
| 7,748,001 B2 | | 6/2010 | Burns et al. | |
| 7,852,872 B2 | * | 12/2010 | Fischer | H04W 52/0212 370/445 |
| 8,364,185 B2 | * | 1/2013 | Thadasina | H04W 56/002 370/350 |
| 8,635,621 B2 | | 1/2014 | Levitan et al. | |
| 9,692,701 B1 | * | 6/2017 | Chu | G06F 16/9574 |
| 2003/0110409 A1 | * | 6/2003 | Gale | H04L 45/02 714/4.11 |
| 2004/0073910 A1 | | 4/2004 | Hokenek et al. | |
| 2004/0172631 A1 | | 9/2004 | Howard | |
| 2005/0216635 A1 | | 9/2005 | Nishimura | |
| 2006/0059485 A1 | | 3/2006 | Onufryk et al. | |
| 2006/0075404 A1 | | 4/2006 | Rosu et al. | |
| 2006/0184946 A1 | | 8/2006 | Bishop et al. | |
| 2007/0198980 A1 | | 8/2007 | Kwon | |
| 2008/0028197 A1 | | 1/2008 | Sawai | |
| 2009/0138682 A1 | | 5/2009 | Capps, Jr. et al. | |
| 2010/0077399 A1 | | 3/2010 | Plondke et al. | |
| 2010/0229179 A1 | | 9/2010 | Moore et al. | |
| 2011/0302588 A1 | | 12/2011 | Cornwell et al. | |
| 2012/0023502 A1 | | 1/2012 | Marr | |
| 2013/0111489 A1 | | 5/2013 | Glew et al. | |
| 2014/0019710 A1 | | 1/2014 | Kataoka et al. | |
| 2014/0164662 A1 | | 6/2014 | van Schaik | |
| 2014/0282507 A1 | | 9/2014 | Plondke et al. | |
| 2014/0310723 A1 | | 10/2014 | Yamauchi et al. | |
| 2014/0373021 A1 | | 12/2014 | Teixeira et al. | |
| 2015/0135183 A1 | | 5/2015 | Kipp | |
| 2016/0217197 A1 | | 7/2016 | Rachlin | |
| 2016/0239345 A1 | | 8/2016 | Rachlin | |
| 2017/0222895 A1 | | 8/2017 | Rachlin | |
| 2017/0228225 A1 | | 8/2017 | Rachlin | |
| 2017/0228329 A1 | | 8/2017 | Rachlin | |
| 2017/0235520 A1 | | 8/2017 | Rachlin | |
| 2017/0344364 A1 | | 11/2017 | Rachlin et al. | |
| 2017/0351500 A1 | | 12/2017 | Rachlin et al. | |
| 2017/0357247 A1 | | 12/2017 | Krishnamurthy et al. | |
| 2018/0109654 A1 | | 4/2018 | Rachlin | |

OTHER PUBLICATIONS

Partial European Search Report in connection with European Patent Application No. EP 16151386.6 dated Aug. 17, 2016, 7 pages.

Office Action in connection with U.S. Appl. No. 14/622,465 dated Sep. 1, 2016, 24 pages.

Extended European Search Report in connection with European Patent Application No. EP16154359.0 dated Jun. 23, 2016, 7 pages.

"Experion Local Control Network", Honeywell Connected Industrial, Doc. No. EP03-390-501 version A, Aug. 7, 2017, 18 pages.

\* cited by examiner

APPARATUS AND METHOD FOR DETECTING NETWORK PROBLEMS ON REDUNDANT TOKEN BUS CONTROL NETWORK USING TRAFFIC SENSOR

TECHNICAL FIELD

This disclosure generally relates to network fault detection systems. More specifically, this disclosure relates to an apparatus and method for detecting network problems on a redundant token bus control network using a traffic sensor.

BACKGROUND

Industrial process control and automation systems are often used to automate large and complex industrial processes. These types of control and automation systems routinely include a large number of devices, such as process controllers and field devices like sensors and actuators. At least some of the process controllers typically receive measurements from the sensors and generate control signals for the actuators. Higher-level components often interact with the process controllers and perform other functions in the control and automation systems, such as optimization or planning.

Control and automation systems routinely include various types of communication networks, which are used to transport data between components in the systems. Often times, at least some of these networks are implemented using a redundant pair of networks, such as a redundant pair of networks that couple a process controller to its sensors and actuators or a redundant pair of networks that couple a process controller to higher-level components. As particular examples, an older type of redundant network uses of a pair of token bus networks, while a newer type of redundant network uses of a pair of Ethernet networks.

The use of redundant networks can help to reduce the likelihood that a fault in one network causes a loss of view or a loss of control over an industrial process. Without redundancy, a fault in a network cable or other network fault could disrupt the proper operation of a control and automation system. For example, a network fault could prevent components from communicating with one another, which could interfere with control or automation functions. The use of redundant networks helps to ensure that a fault in one of the networks does not cause a loss of view or a loss of control since the other network can continue to transport data. Ideally, maintenance personnel or other personnel would be dispatched to resolve a network fault once the fault is detected. However, detecting a network fault can be problematic in some circumstances.

SUMMARY

This disclosure provides an apparatus and method for detecting network problems on a redundant token bus control network using a traffic sensor.

In a first embodiment, an apparatus includes an interface configured to obtain data associated with multiple cables coupled to or forming a part of a redundant token bus control network. The apparatus also includes a traffic detector configured to determine whether valid data traffic is being received over the cables from the redundant token bus control network based on the data. The apparatus further includes at least one processing device configured to determine whether one or more of the cables has experienced a network fault or a return from a network fault based on the determination of whether valid data traffic is being received over the cables. The at least one processing device is also configured, in response to determining that one or more of the cables has experienced a network fault or a return from a network fault, to generate a notification that identifies the apparatus and the one or more cables and output the notification.

In a second embodiment, a method includes obtaining, at a networked device, data associated with multiple cables coupled to or forming a part of a redundant token bus control network. The method also includes determining whether valid data traffic is being received over the cables from the redundant token bus control network based on the data. The method further includes determining whether one or more of the cables has experienced a network fault or a return from a network fault based on the determination of whether valid data traffic is being received over the cables. In addition, the method includes, in response to determining that one or more of the cables has experienced a network fault or a return from a network fault, generating a notification that identifies the networked device and the one or more cables and outputting the notification.

In a third embodiment, a system includes a redundant set of networked devices, where each networked device is configured to be coupled to a redundant token bus control network. Each of the networked devices includes an interface configured to obtain data associated with multiple cables coupled to or forming a part of the redundant token bus control network. Each of the networked devices also includes a traffic detector configured to determine whether valid data traffic is being received over the cables from the redundant token bus control network based on the data. Each of the networked devices further includes at least one processing device configured to determine whether one or more of the cables has experienced a network fault or a return from a network fault based on the determination of whether valid data traffic is being received over the cables. The at least one processing device is also configured, in response to determining that one or more of the cables has experienced a network fault or a return from a network fault, to generate a notification that identifies the networked device and the one or more cables and output the notification.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
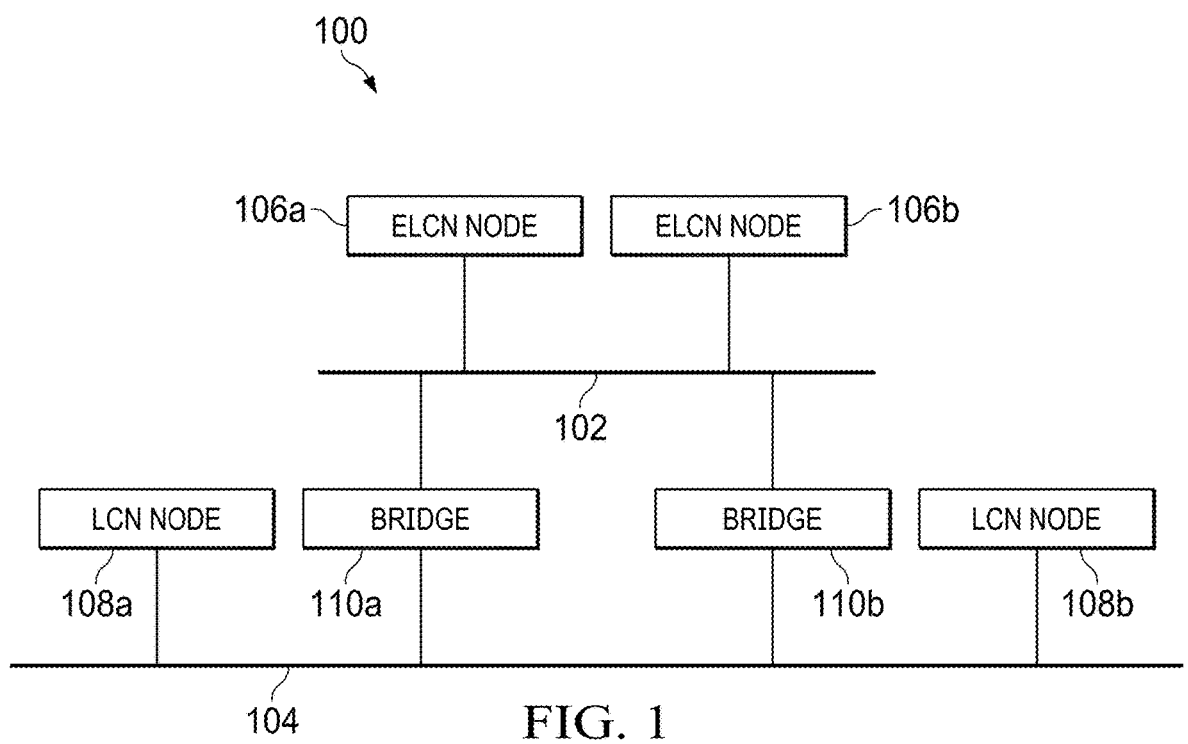
FIG. 1 illustrates a portion of an example industrial process control and automation system according to this disclosure.

FIGS. 1 through 8, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

As described above, the use of redundant networks in industrial process control and automation systems can help to reduce the likelihood that a fault in one network causes a loss of view or a loss of control over an industrial process. Ideally, a network fault can be detected quickly, and personnel can be dispatched to resolve the network fault once the fault is detected. Unfortunately, there are some circumstances where network fault detection can be problematic.

In some control and automation systems, older and newer control network technologies are used together, such as when older token bus networks and newer Ethernet networks are used together. It can be difficult for some types of network faults associated with the older networks to be detected and identified to users in one or both of the older and newer networks. For example, when certain types of network faults occur in a token bus network, it may be difficult to identify specific coaxial cables or other cables associated with the network faults to users of the token bus network or to users of an Ethernet-based network.

As a particular example, some control and automation systems include both legacy LOCAL CONTROL NETWORKS (LCNs) and newer EXPERION LOCAL CONTROL NETWORKS (ELCNs) from HONEYWELL INTERNATIONAL INC. This may occur, for instance, when a system is being incrementally migrated from an LCN-based system to an ELCN-based system so that nodes of both types are used within the system. A bridge device can be used to connect an LCN and an ELCN so that devices coupled to the LCN and devices coupled to the ELCN are able to communicate with one another. However, certain network faults involving the bridge device may not be fully diagnosable from a legacy LCN display, such as in a legacy system status display or a legacy cable diagnostic display. Moreover, there may be no conventional way for an EXPERION user to diagnose a bridge device as being the source of a network fault that occurs in the LCN.

In one prior approach, a user could be informed that there was a network fault somewhere in an LCN but without any indication of where the network fault was actually occurring in the LCN. The user then had to navigate through a series of diagnostic displays to try to ascertain which node in the LCN had a faulty cable. This required the user to look at the LCN from each node's view of the other nodes. This was a time-consuming process, and it was not always possible to pinpoint the exact network fault. Moreover, noise on a network cable (such as due to spurious signals or grounding issues) could result in "spoofing" or false alarms, meaning the noise could appear as a network fault even though no fault actually existed.

In accordance with this disclosure, a fault detection mechanism is disclosed that helps to detect network problems on a redundant token bus control network. More specifically, a traffic sensor is used in or with a networked device, such as a bridge device that is used to couple different types of control networks (including a redundant token bus control network and another control network). The traffic sensor is configured to detect traffic on coaxial cables or other cables of the redundant token bus network coupled to the networked device.

If the traffic sensor is unable to detect traffic on one or both of the coaxial cables or other cables, this is indicative that the redundant token bus network may be suffering from a network fault in one or both cables. When this condition is detected, a warning or alarm could be generated, and/or a graphical user interface identifying the network fault could be presented to one or more users. Part of the alarm, warning, graphical user interface, or other notification can include an identification of the networked device and an identification of the cable associated with the network fault. As a result, the actual locations of network faults can be identified more easily, allowing corrective action (such as maintenance or network reconfiguration) to occur more effectively.

If the traffic sensor later detects traffic on one or both of the coaxial cables or other cables that had previously been experiencing a network fault, this may be indicative of a "return" from a network fault, meaning the redundant token bus network may no longer be suffering from a network fault in one or both cables. When this condition is detected, a previous warning or alarm could be cleared, and/or a graphical user interface identifying the updated cable status could be presented to one or more users.

FIG. 1 illustrates a portion of an example industrial process control and automation system 100 according to this disclosure. The industrial process control and automation system 100 here includes multiple control networks, which in this example include two specific types of control networks (namely LCN and ELCN). However, this disclosure is not limited to use with LCN and ELCN, and the system 100 could include any other suitable types of control networks.

As shown in FIG. 1, the system 100 includes at least one first control network 102 and at least one second control network 104. In this example, there is a single control network 102 and a single control network 104. However, any number of the first and second control networks could be used here. In this particular example, the first network 102 represents an ELCN and includes or is coupled to various ELCN nodes 106a-106b. Also, in this particular example, the network 104 represents an LCN and includes or is coupled to various LCN nodes 108a-108b. Note, however, that each network 102, 104 could include or be coupled to any suitable number of nodes.

The functions performed or supported by the nodes 106a-106b, 108a-108b could vary widely, depending on the functions needed or desired in the industrial process control and automation system 100. As an example, one or more of the nodes 106a-106b, 108a-108b could represent one or more industrial process controllers, each of which could interact with one or more sensors and one or more actuators in order to control an industrial process (or portion thereof). As particular examples, one or more of the nodes 106a-106b, 108a-108b could be configured to perform control operations for equipment used to manufacture chemical, pharmaceutical, paper, or petrochemical products. As another example, one or more of the nodes 106a-106b, 108a-108b could represent one or more operator consoles that are configured to provide information identifying a current state of an industrial process (such as values of process variables and alarms) and to receive information affecting how the industrial process is controlled (such as setpoints or control modes for process variables). Note that a wide variety of devices could be used in the control and automation system 100, and the above description does not limit this disclosure to use with only the specific types of components mentioned above.

Each node 106a-106b, 108a-108b includes any suitable structure for performing one or more functions related to industrial process control and automation. Each of the nodes 106a-106b, 108a-108b could, for example, include or represent a computing device having one or more processors, one or more memories storing instructions and data used/collected/generated by the processors, and one or more network interfaces for communicating over one or more networks. These types of nodes could execute a real-time operating system, a MICROSOFT WINDOWS operating system, a LINUX operating system, or other suitable operating system.

The nodes 106a-106b, 108a-108b are coupled to each other and to other components of the system 100 using the networks 102, 104. Each network 102, 104 represents any network or combination of networks facilitating communication between components in the system 100. As noted above, the networks 102, 104 represent different types of control networks (such as LCN and ELCN), and the nodes 106a-106b, 108a-108b represent different types of devices (such as LCN and ELCN devices). The network 102 could be formed using a redundant pair of Ethernet networks, such as when implemented as a FAULT TOLERANT ETHERNET (FTE) network from HONEYWELL INTERNATIONAL INC. Also, the network 104 could be formed using a redundant pair of token bus networks, such as when implemented using coaxial cables. Although LCN nodes and ELCN nodes may share many characteristics, there are differences in communication protocols between LCN nodes and ELCN nodes, such as different parameters, formats, and the like.

To help ensure communication compatibility between the ELCN nodes 106a-106b and the LCN nodes 108a-108b, the system 100 includes one or more network bridges 110a-110b. In this example, there are two network bridges 110a-110b coupling the network 104 to the network 102. However, the system 100 could include any number of network bridges in any suitable configuration. Each of the network bridges 110a-110b operates as a media converter that converts messages from an ELCN protocol to an LCN protocol and vice versa (or between any other suitable protocols). Each of the network bridges 110a-110b can also perform message forwarding, message filtering (such as discarding invalid messages), and rate limiting (such as disallowing messages from moving too fast from one network to another since ELCN networks are typically much faster than LCN networks).

Each of the network bridges 110a-110b includes any suitable structure for converting between different protocols used by different control networks. Each of the network bridges 110a-110b could, for example, include or represent a computing device having one or more processors, one or more memories storing instructions and data used/collected/generated by the processors, and network interfaces for communicating over different control networks. These types of network bridges could execute a real-time operating system, a MICROSOFT WINDOWS operating system, a LINUX operating system, or other suitable operating system.

In some embodiments, the network bridges 110a-110b could operate as a redundant pair, meaning one network bridge in the pair operates in a primary role and facilitates communications between control networks while the other network bridge in the pair operates in a secondary role and can take over the primary role if needed. The secondary network bridge can communicate with the primary network bridge as needed so that the secondary network bridge has the information it needs to take over operation in the primary role if needed. In particular embodiments, a pair of network bridges could be placed side-by-side in a rack of equipment.

As noted above, it may be difficult to identify certain types of network faults involving the network bridges 110a-110b. For example, in some embodiments, each network bridge 110a-110b may be assigned an LCN node number that is higher than any legacy LCN node number assigned to any of the nodes 108a-108b. As a particular example, the nodes 108a-108b could be assigned node numbers ranging from 01 to 96, and each network bridge 110a or 110b could be assigned a node number of 97 or 98. Since these network bridges 110a-110b are protocol converters and not participating as a member node of the greater LCN, this can prevent certain network faults involving the network bridges 110a-110b from being fully diagnosable using a legacy LCN display. Also, certain types of network faults involving the network bridges 110a-110b may not be associated with the network bridges 110a-110b in conventional ELCN displays. Thus, conventional approaches may not specifically identify both the network bridge and the cable associated with a network fault, which can make it more difficult to identify and resolve the fault.

As described in more detail below, each of the network bridges 110a-110b includes a fault detection mechanism that helps to identify network faults associated with the coaxial cables or other cables of a redundant token bus network (the network 104 in this example). The fault detection mechanism can detect when traffic is lost over one or more cables of the redundant token bus network, and the associated network bridge 110a-110b can trigger an alarm or warning, generate or update a graphical user interface, or generate any other suitable notification identifying the problem. The alarm, warning, graphical user interface, or other notification can identify the network bridge 110a-110b and the cable associated with the network fault, allowing the actual location of the network fault to be more easily identified by users in another control network (the network 102 in this example). Upon detecting a return from a network fault, the fault detection mechanism could clear the warning or alarm, generate or update a graphical user interface, or generate any other suitable notification identifying the current cable status. Additional details regarding the fault detection mechanism are provided below.

Although FIG. 1 illustrates one portion of an example industrial process control and automation system 100, various changes may be made to FIG. 1. For example, the control and automation system 100 could include any number of networks, nodes, network bridges, or other devices. Also, industrial control and automation systems come in a wide variety of configurations, and the system 100 shown in FIG. 1 is meant to illustrate one example operational environment in which fault detection can be used. However, FIG. 1 does not limit this disclosure to any particular configuration or operational environment. In addition, note that while often described as being used in network bridges, the fault detection mechanism described below could be used in any other suitable networked device that is coupled to a redundant token bus network.

Figure 4:
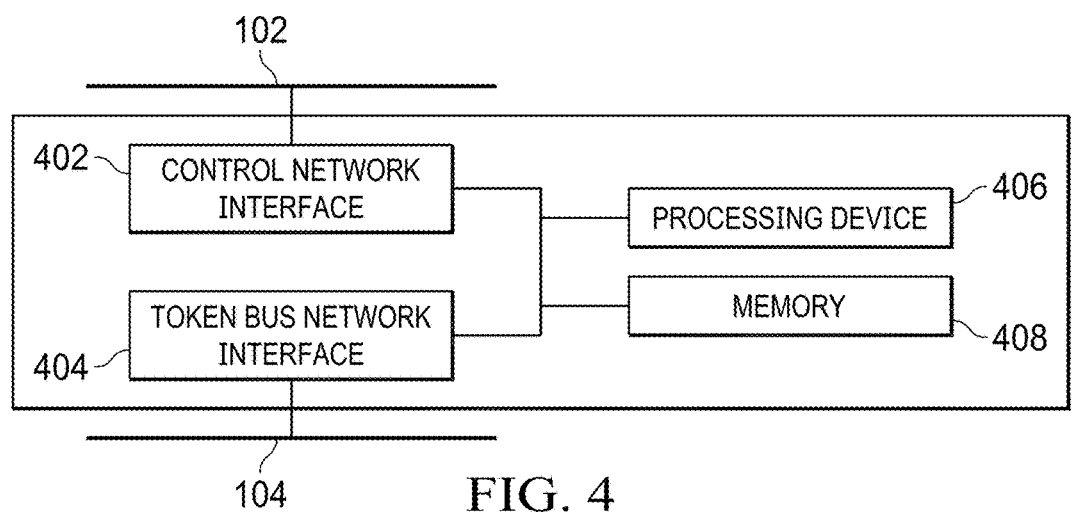
FIGS. 2 through 4 illustrate an example network bridge for coupling different control networks in an industrial process control and automation system according to this disclosure.
Figure 2:
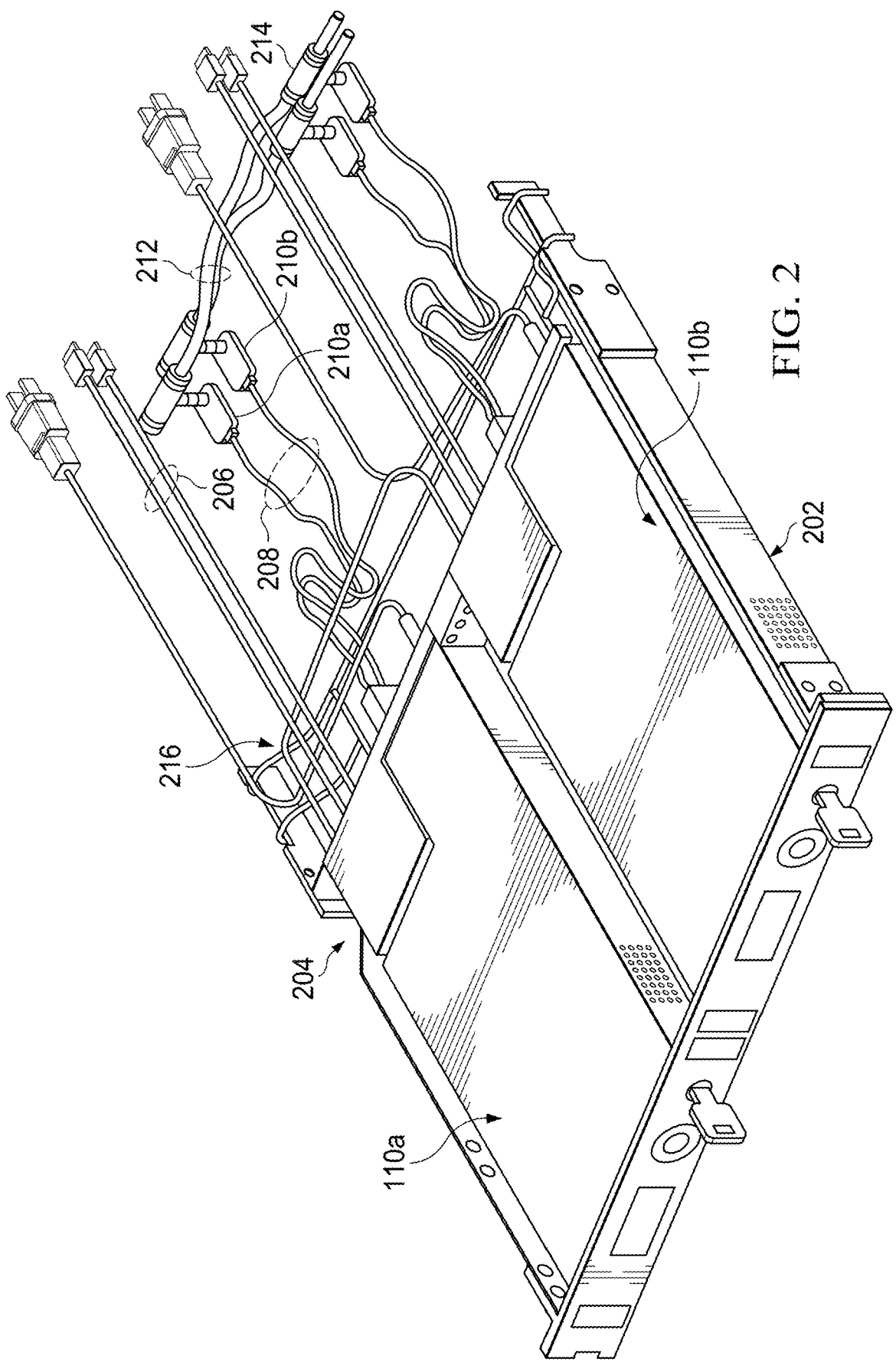
Figure 3:
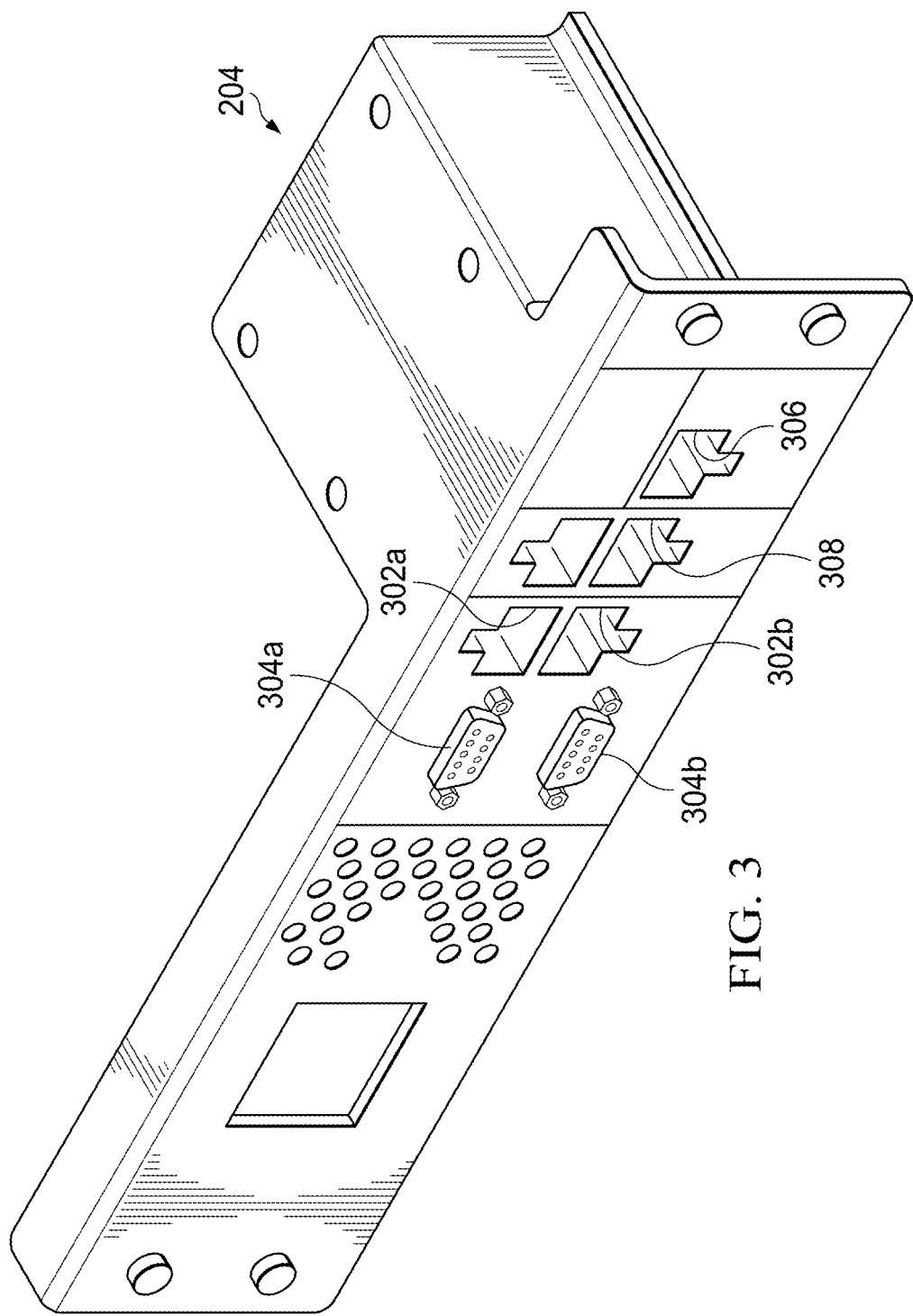

FIGS. 2 through 4 illustrate an example network bridge 110a-110b for coupling different control networks in an industrial process control and automation system according to this disclosure. For ease of explanation, the network bridges 110a-110b shown in FIGS. 2 through 4 are described as being used in the industrial process control and automation system 100 of FIG. 1. However, the network bridges 110a-110b shown in FIGS. 2 through 4 could be used in any other suitable system.

FIG. 2 shows the network bridges 110a-110b arranged as a pair in a redundant configuration, which is designed to be installed in a rack using a rack mount 202. Of course, other mounting options could also be used. Each of the network bridges 110a-110b includes various components that facilitate communication over different types of control networks. For example, the components of each network bridge 110a-110b could support functions for message conversion, message forwarding, message filtering, and rate limiting. The components of each network bridge 110a-110b could also perform functions related to fault detection as described below. The components of each network bridge 110a-110b could further perform any other or additional functions as needed or desired in the network bridge.

Each of the network bridges 110a-110b includes or is coupled to a termination module 204. Each termination module 204 denotes a structure to which cables or other communication links are coupled to the associated network bridge 110a-110b. Each termination module 204 includes any suitable structure for coupling to and exchanging data over multiple cables or other communication links. Note that while fault detection is described as being performed by components of the network bridges 110a-110b, this functionality could also be implemented partially or fully within the termination modules 204.

In this example, each termination module 204 is coupled to a pair of Ethernet cables 206, which could be coupled to or form a part of an ELCN or other Ethernet-based control network 102. Each termination module 204 is also coupled to a pair of LCN or other token bus-based connector cables 208, each of which could represent a nine-pin cable or other cable. Each pair of connector cables 208 couples the associated termination module 204 to a pair of media access units (MAUs) 210a-210b. Each pair of media access units 210a-210b supports functions that allow communication over a pair of coaxial cables 212, which could be coupled to or form a part of an LCN or other token bus-based control network 104. For instance, each media access unit 210a-210b could support analog-to-digital conversion functionality for processing incoming signals and digital-to-analog conversion functionality for transmitting outgoing signals. Each media access unit 210a-210b could also receive a validity signal indicating when that media access unit might receive data that is valid, so the validity signal can be used by the media access unit to control when incoming signals are digitized. The media access units 210a-210b are coupled to the coaxial cables 212 using various connectors 214, which in this example allow multiple media access units to be coupled to each coaxial cable 212.

Each termination module 204 is further coupled to a common Ethernet cable 216, which couples the termination modules 204 of the network bridges 110a-110b together. When the network bridges 110a-110b operate as a redundant pair, each network bridge 110a-110b can exchange data with the other network bridge 110a-110b using the common Ethernet cable 216. Each network bridge 110a-110b could also potentially detect a failure of the other network bridge 110a-110b using the common Ethernet cable 216.

Each cable 206, 208, 212, 216 includes any suitable communication medium or media configured to transport data. While specific types of cables 206, 208, 212, 216 are described above, any other suitable cables could be used here. Each media access unit 210a-210b includes any suitable structure configured to transmit or receive data over a token bus network. Each connector 214 includes any suitable structure configured to couple to a coaxial cable or other cable of a token bus network, such as a Bayonet Neill-Concelman (BNC) connector.

FIG. 3 illustrates additional details of each of the termination modules 204. As shown in FIG. 3, each termination module 204 includes two ports 302a-302b, which can be coupled to the pair of Ethernet cables 206 in order to communicatively couple the termination module 204 to an ELCN or other Ethernet-based control network 102. Each termination module 204 also includes two ports 304a-304b, which can be coupled to the pair of connector cables 208 in order to communicatively couple the termination module 204 to an LCN or other token bus-based control network 104. Each termination module 204 further includes a port 306, which can be coupled to the common cable 216 in order to communicatively couple the termination module 204 to another termination module 204. In addition, each termination module 204 could optionally include one or more additional ports 308a-308b, which allow the termination module 204 and the associated network bridge 110a-110b to be coupled to other devices or systems.

Each of the ports 302a-302b, 304a-304b, 306, 308 includes any suitable structure configured to be coupled to a cable or other communication link. For example, each of the ports 302a-302b, 306, 308 could represent an RJ-45 jack configured to receive an Ethernet connector, and each of the ports 304a-304b could represent a nine-pin connector. However, each of the ports 302a-302b, 304a-304b, 306, 308 could have any other suitable form.

FIG. 4 illustrates example internal components of each of the network bridges 110a-110b. In this example, each network bridge 110a-110b includes two interfaces 402 and 404. The interface 402 supports communication over an ELCN or other Ethernet-based control network 102, such as via the termination module 204. For example, the interface 402 could format outgoing data for transmission over one or more Ethernet cables and process incoming data received over the one or more Ethernet cables using a suitable protocol. The interface 402 can communicate with the Ethernet cable(s) via the port(s) 302a-302b. The interface 402 includes any suitable structure for communicating over a control network, such as one or more transceivers, filters, amplifiers, or other components.

The interface 404 supports communication over an LCN or other redundant token bus control network 104, such as via the termination module 204. For example, the interface 404 could format outgoing data for transmission over coaxial cables and process incoming data received over the coaxial cables using a suitable protocol. The interface 404 can communicate with the coaxial cables via the ports 304a-304b. The interface 404 includes any suitable structure for communicating over a redundant token bus control network, such as one or more transceivers, filters, amplifiers, or other components.

Each network bridge 110a-110b also includes at least one processing device 406 and at least one memory 408. The processing device 406 controls the overall operation of the network bridge 110a-110b. For example, the processing device 406 could control the operations of the interfaces 402-404 to thereby control the transmission and reception of data by the network bridge 110a-110b. The processing device 406 could also support translations or other operations needed to support the flow of data between the different interfaces 402-404. For instance, the processing device 406 could perform message conversion, message forwarding, message filtering, and rate limiting. The processing device 406 includes any suitable structure for performing or controlling operations of a network bridge, such as one or more processing or computing devices. As particular examples, the processing device 406 could include at least one microprocessor, microcontroller, digital signal processor (DSP), field programmable gate array (FPGA), application specific integrated circuit (ASIC), or discrete logic device.

The memory 408 stores instructions or data used, generated, or collected by the network bridge 110a-110b. For example, the memory 408 could store software or firmware instructions executed by the processing device 406. The memory 408 could also store data received via one interface 402-404 that is to be transmitted over another interface 402-404. The memory 408 includes any suitable volatile and/or non-volatile storage and retrieval device(s), such as at least one random access memory (RAM) and at least one Flash or other read-only memory (ROM).

Although FIGS. 2 through 4 illustrate one example of a network bridge 110a-110b for coupling different control networks in an industrial process control and automation system, various changes may be made to FIGS. 2 through 4. For example, each network bridge 110a-110b could have any suitable form factor and could be coupled to multiple control networks in any suitable manner. Also, a network bridge 110a-110b need not be used in a redundant arrangement. Further, a network bridge 110a-110b could be coupled to a single Ethernet-based control network or more than two token bus-based control networks. In addition, some of the components shown in FIGS. 2 through 4 could be used in other types of networked devices, such as networked devices coupled to a redundant token bus network but not to other control networks. The fault detection mechanisms described here could be used in those types of networked devices to identify faults in cables coupling the devices to the redundant token bus network.

Figure 5:
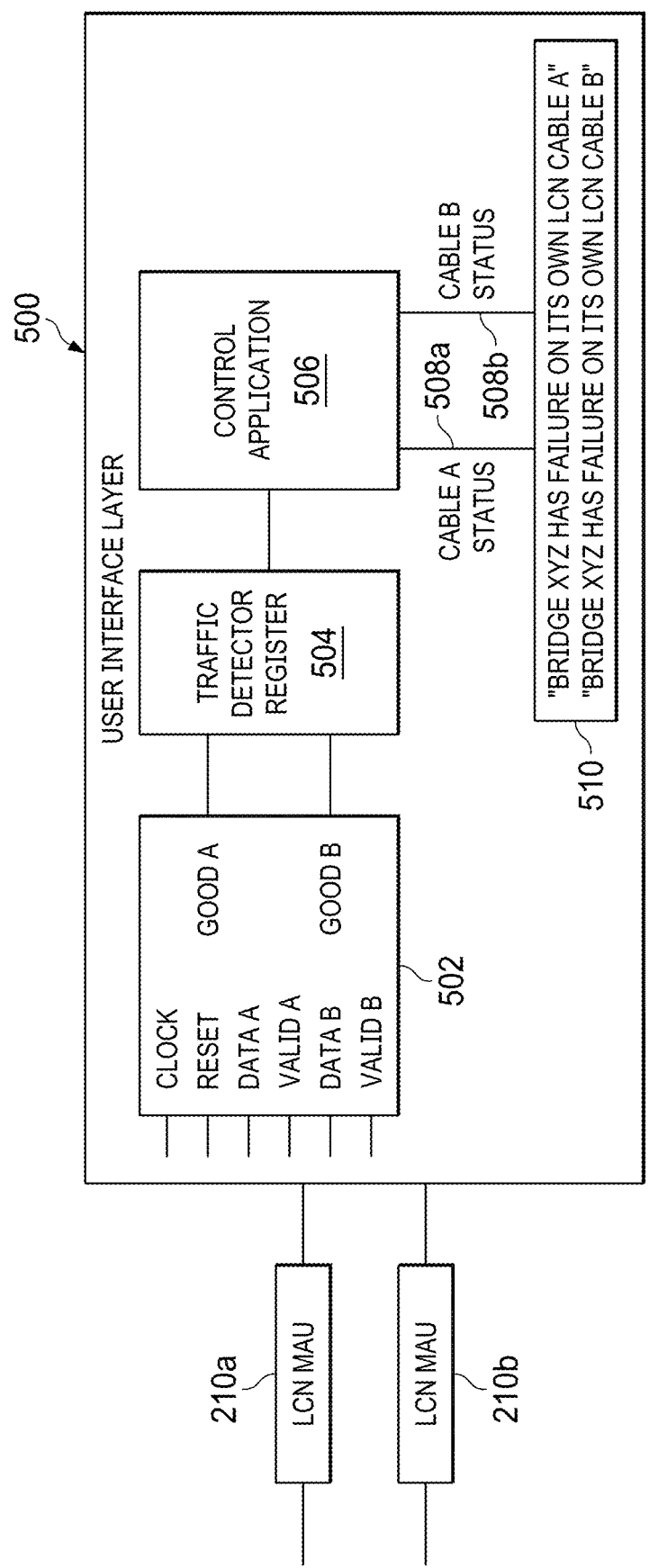
FIG. 5 illustrates an example fault detection architecture for identifying a network fault on a redundant token bus control network according to this disclosure.

FIG. 5 illustrates an example fault detection architecture 500 for identifying a network fault on a redundant token bus control network according to this disclosure. For ease of explanation, the fault detection architecture 500 of FIG. 5 is described as being used in either of the network bridges 110a-110b of FIGS. 2 through 4 within the system 100 of FIG. 1. However, the fault detection architecture 500 could be used in any other suitable device and in any other suitable system.

As shown in FIG. 5, the fault detection architecture 500 includes a traffic detector 502, which processes various signals to determine whether valid data traffic is being received from the redundant token bus network. In this example, the traffic detector 502 receives two data signals (Data A and Data B), as well as two validity signals indicating whether the data signals might contain valid data (Valid A and Valid B). The two data signals can be generated by the two media access units 210a-210b, such as when the media access units 210a-210b digitize signals received over the coaxial cables 212. The two validity signals can be generated by a control application 506 and indicate to the media access units 210a-201b and to the traffic director 502 when data is incoming and could be valid. The traffic detector 502 can also receive additional signals, such as a clock signal and a reset signal, from any suitable source(s). The clock signal can be used to control the operations of the traffic detector 502, and the reset signal can be used to reset the internal state of the traffic detector 502.

The traffic detector 502 analyzes the data signals and determines whether they are indicative of valid data traffic being received over each cable coupled to a redundant token bus network. The traffic detector 502 could perform any suitable analysis to determine whether valid data traffic is being received over a cable from a redundant token bus network. For example, as described below, the traffic detector 502 could perform start-of-frame detection (SFD) and identify a number of frames (if any) that appear within a specified time period. If an inadequate number of start-of-frame events are detected, this is indicative of a network problem. Note, however, that any other suitable technique for identifying valid data traffic over a redundant token bus network could be used by the traffic detector 502.

The traffic detector 502 outputs two data values (Good A and Good B) indicating whether each cable coupled to the redundant token bus network is experiencing a network fault. For example, each output data value could include a single bit having a "1" value if a network cable is not experiencing a network fault or a "0" value if a network cable is experiencing a network fault (or vice versa). Of course, any other suitable data values could be used here. The traffic detector 502 can repeat its analysis at any suitable interval or continuously (such as with a sliding window of time) to update the output data values in order to reflect any changes to the statuses of the cables coupled to the redundant token bus network.

The traffic detector 502 includes any suitable structure for identifying valid data traffic over a token bus network. In some embodiments, the traffic detector 502 could be implemented using an FPGA, which could be programmed to provide the desired functionality, such as start-of-frame detection and start-of-frame event counting. Of course, other hardware mechanisms could be used to implement the traffic detector 502, such as a microprocessor, microcontroller, DSP, ASIC, or discrete logic.

The fault detection architecture 500 also includes at least one traffic detector register 504, which stores the output data values (Good A and Good B) from the traffic detector 502. For example, the traffic detector register 504 could store each of the two one-bit values generated by the traffic detector 502 so that the one-bit values can be retrieved and processed by other components of the fault detection architecture 500. Each traffic detector register 504 includes any suitable structure for storing one or more values.

The fault detection architecture 500 further includes a control application 506, which could denote an application executed by the processing device 406 of the network bridge 110a-110b. The control application 506 when executed could implement various functions related to the network bridge 110a-110b, such as functions supporting the exchange of messages between different control networks. The control application 506 when executed could also retrieve the data values output by the traffic detector 502 and stored in the traffic detector register 504 for analysis. In some embodiments, the control application 506 polls the traffic detector register 504 at a specified interval (such as every 250 milliseconds) to obtain the data values stored in the traffic detector register 504. However, any other suitable mechanism could be used to allow the control application 506 to obtain the data values from the traffic detector register 504.

The data values generated by the traffic detector 502 are used by the control application 506 to identify whether an alarm, warning, graphical user interface, or other notification should be generated or updated. For example, the control application 506 could determine whether the data values obtained from the traffic detector register 504 indicate that neither, one, or both cables coupled to the redundant token bus network are experiencing a network fault. If no network fault is detected, the control application 506 can output status values 508a-508b indicating both network cables are good (have no errors). If one network fault is detected, the control application 506 can output status values 508a-508b indicating that one network cable is good (has no errors) and one network cable is bad (has an error). If multiple network faults are detected, the control application 506 can output status values 508a-508b indicating that both network cables are bad (have errors). The status values 508a-508b therefore indicate whether a network fault has been detected on a cable and, if so, which cable has the network fault. The status values 508a-508b can also indicate a return from a previous network fault.

In some embodiments, the control application 506 may require that the traffic detector 502 output a specified number of data values indicating that a network fault or a return from a network fault exists before the control application 506 takes action. For example, the control application 506 could require that the output data values from the traffic detector 502 have a specified value (such as "0") for more than one consecutive polling interval before the cable associated with the data values is deemed to have a network fault. Similarly, the control application 506 could require that the output data values from the traffic detector 502 have a specified value (such as "1") for more than one consecutive polling interval before the cable associated with the data values is deemed to have returned from a prior network fault. Effectively, the control application 506 is "de-bouncing" the data values output by the traffic detector 502. This helps to prevent spurious signals, grounding issues, or other noise on a coaxial cable 212 from causing an incorrect network fault status to be identified by the control application 506. This allows the fault detection architecture 500 to more effectively identify network faults in the presence of noise.

The control application 506 includes any suitable logic for analyzing data values to identify network faults. The control application 506 could, for example, be implemented using software/firmware instructions that are executed by the processing device 406. However, the functionality of the control application 506 could be implemented in any other suitable manner.

The status values 508a-508b in this example are provided to or used by a user interface layer 510. The user interface layer 510 provides information to one or more users via any suitable mechanism. For example, the user interface layer 510 could generate a faceplate that is associated with a network bridge 110a-110b and that is presented on the display of one or more operator consoles. The faceplate could provide various information about the network bridge 110a-110b, including an indication of the status of the bridge device's cables to a redundant token bus network. The user interface layer 510 could also or alternatively generate an alarm, warning, or other notification that is presented on the display of one or more operator consoles. In general, the user interface layer 510 could provide any suitable notifications regarding network faults or returns from network faults to one or more users. Also, because of the functionality described above, the indication provided to the user(s) can identify the specific device and the specific cable associated with each network fault or network fault return.

The user interface layer 510 includes any suitable logic for presenting to one or more users information that includes network fault information. The user interface layer 510 could, for example, be implemented using software/firmware instructions that are executed by the processing device 406. However, the functionality of the user interface layer 510 could be implemented in any other suitable manner.

Although FIG. 5 illustrates one example of a fault detection architecture 500 for identifying a network fault on a redundant token bus control network, various changes may be made to FIG. 5. For example, the functional division shown in FIG. 5 is for illustration only. Various components could be combined, further subdivided, rearranged, or removed and additional components could be added according to particular needs. Also, the fault detection architecture 500 could be used to sense network faults and returns from network faults in more than two network cables. In addition, FIG. 5 is merely meant to illustrate the operations of the fault detection architecture 500 in a networked device and does not include other components that are used to process data from the signals received from the media access units 210a-210b.

Figure 6:
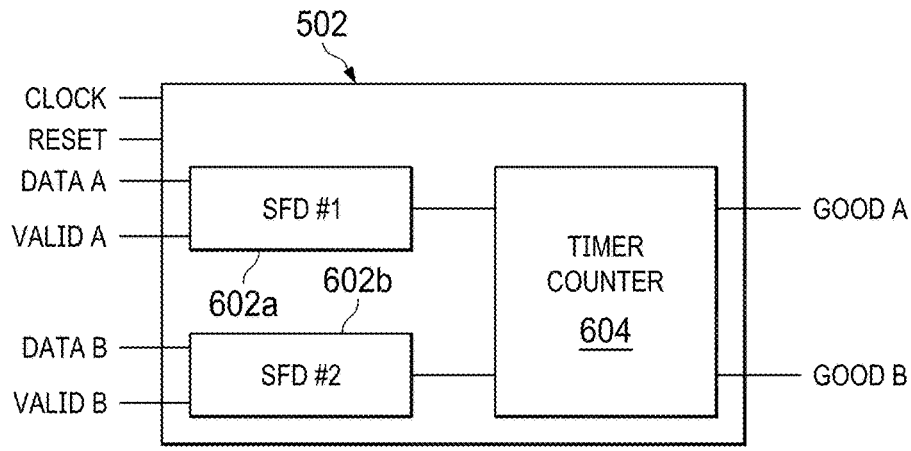
FIG. 6 illustrates an example traffic detector used in the fault detection architecture of FIG. 5 according to this disclosure.

FIG. 6 illustrates an example traffic detector 502 used in the fault detection architecture 500 of FIG. 5 according to this disclosure. As shown in FIG. 6, the traffic detector 502 includes multiple start-of-frame detectors 602a-602b and at least one timer counter 604. Each start-of-frame detector 602a-602b receives a data signal (Data A or Data B) from one of the media access units 210a-210b and a validity signal (Valid A or Valid B) from the control application 506. When a validity signal indicates that the associated media access unit 210a-210b is digitizing and outputting data that might be valid, the associated start-of-frame detector 602a-602b analyzes the data and attempts to identify start-of-frame events in the data. For instance, each start-of-frame detector 602a-602b could analyze digital data from one of the media access units 210a-210b and determine if the digital data contains any bit patterns that indicate a start of a data frame. Each start-of-frame detector 602a-602b can output values identifying any detected start-of-frame events.

The at least one timer counter 604 counts the number of detected start-of-frame events from the start-of-frame detectors 602a-602b and determines whether at least a specified minimum number of start-of-frame events are detected within a given time period. For example, the timer counter 604 could determine whether a specified number of start-of-frame events (such as five, ten, or twenty start-of-frame events) are detected within a certain amount of time. The timer counter 604 can output a first bit value (such as "1") for each data signal in which the specified minimum number of start-of-frame events has been detected and a second bit value (such as "0") for each data signal in which the specified minimum number of start-of-frame events has not been detected. The timer counter 604 can reset its count values at the end of each given time period in order to count the number of start-of-frame events for the next time period. This process can be repeatedly performed in order to generate sequences of values indicating whether valid data traffic is present on the cables coupling the networked device to the redundant token bus network.

Each start-of-frame detector 602a-602b includes any suitable structure for identifying starts of data frames. Each timer counter 604 includes any suitable structure for counting events in a specified time period. In particular embodiments, the start-of-frame detectors 602a-602b and the timer counter 604 are implemented together within an FPGA. Of course, other hardware mechanisms could be used to implement the start-of-frame detectors 602a-602b and the timer counter 604, such as a microprocessor, microcontroller, DSP, ASIC, or discrete logic.

Although FIG. 6 illustrates one example of a traffic detector 502 used in the fault detection architecture 500 of FIG. 5, various changes may be made to FIG. 6. For example, the functional division shown in FIG. 6 is for illustration only. Various components could be combined, further subdivided, rearranged, or removed and additional components could be added according to particular needs. Also, the traffic detector 502 could be used to sense network faults in more than two network cables.

Figure 7:
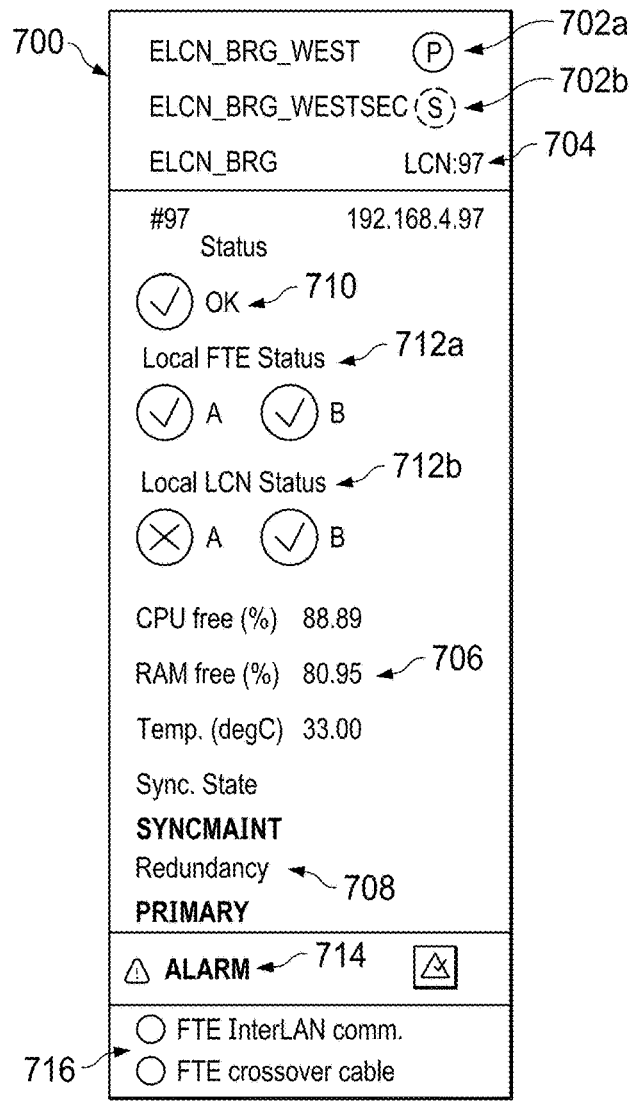
FIG. 7 illustrates an example graphical user interface for presenting information associated with a device coupled to a redundant token bus control network according to this disclosure.

FIG. 7 illustrates an example graphical user interface 700 for presenting information associated with a device coupled to a redundant token bus control network according to this disclosure. For ease of explanation, the graphical user interface 700 is described as being generated by the user interface layer 510 in the fault detection architecture 500 of FIG. 5, which can be used to sense network faults with either of the network bridges 110a-110b of FIGS. 2 through 4 within the system 100 of FIG. 1. However, the graphical user interface 700 could be generated by any suitable device operating in or with any suitable system.

As shown in FIG. 7, the graphical user interface 700 represents a faceplate that can be displayed on an operator console or other user device. In this example, the faceplate includes information 702a identifying the specific hardware device associated with the faceplate and (if necessary) its redundancy status. In the specific example shown in FIG. 7, the information 702a identifies the name of an LCN-ELCN bridge operating in a primary role (indicated by the letter P in a solid circle). When the hardware device operates in a redundant pair, the faceplate can also include information 702b identifying the redundant device and its redundancy status. In the specific example shown in FIG. 7, the information 702b identifies the name of a redundant LCN-ELCN bridge operating in a secondary role (indicated by the letter S in a dashed circle). The faceplate here also includes network information 704 associated with the hardware device. In the specific example shown in FIG. 7, the network information 704 identifies the bridge's LCN node number and Ethernet address. Note, however, that any other or additional information could be provided for the hardware device.

The faceplate here also includes device details 706, synchronization details 708, and general status 710. The device details 706 provide information about one or more specific characteristics of the hardware device. In the specific example shown in FIG. 7, the device details 706 identify details regarding the hardware device's central processing unit (CPU) usage, the hardware device's RAM usage, and the hardware device's internal or core temperature. Of course, any other or additional device details could be provided for the hardware device. The synchronization details 708 provide information about the synchronization of the hardware device with another device. In the specific example shown in FIG. 7, the synchronization details 708 identify the hardware device's synchronization state (whether the device is being synchronized with another device) and the hardware device's redundancy state (whether the device is operating in primary or secondary mode). Again, any other or additional synchronization details could be provided for the hardware device. The status 710 generally identifies whether the hardware device is operating properly or is experiencing any errors that prevent the hardware device from operating to achieve its intended purpose.

The faceplate further includes various network fault indicators 712a-712b, which identify any network faults associated with the hardware device. In this example, the hardware device is coupled to an FTE network, which is formed using a redundant pair of Ethernet networks. The network cables associated with the FTE network are not experiencing any network faults here, so the two network fault indicators 712a for the FTE network are in a first state (such as a circle with a green color or first pattern and a checkmark). The hardware device in this example is also coupled to an LCN, which is formed using a redundant token bus network. One of the network cables associated with the LCN is experiencing a network fault while the other network cable is not. As a result, one of the network fault indicators 712b for the LCN is in the first state (such as a circle with a green color or first pattern and a checkmark), while another of the network fault indicators 712b for the LCN is in a second state (such as a circle with a red color or second pattern and an X). The network fault indicators 712a-712b therefore provide a visual identification of the status of various network cables coupled to the hardware device and, if there are any network faults, which network cables are associated with the faults.

The faceplate here also includes an alarm indicator 714 and alarm details 716. The alarm indicator 714 identifies whether there are any active alarms associated with the hardware device. In this example, the alarm indicator 714 indicates that there is an active alarm since Cable A coupling the hardware device to the LCN has a network fault. The alarm details 716 can provide information about active or inactive (acknowledged) alarms. Note that if there are no active or inactive alarms, the alarm details 716 could be omitted or contain no information.

Although FIG. 7 illustrates one example of a graphical user interface 700 for presenting information associated with a device coupled to a redundant token bus control network, various changes may be made to FIG. 7. For example, the content and arrangement of information in the graphical user interface 700 can vary as needed or desired. Also, the associated device need not represent a network bridge. In general, any suitable graphical user interface could be used to identify the network status of a redundant token bus network coupled to a device.

Figure 8:
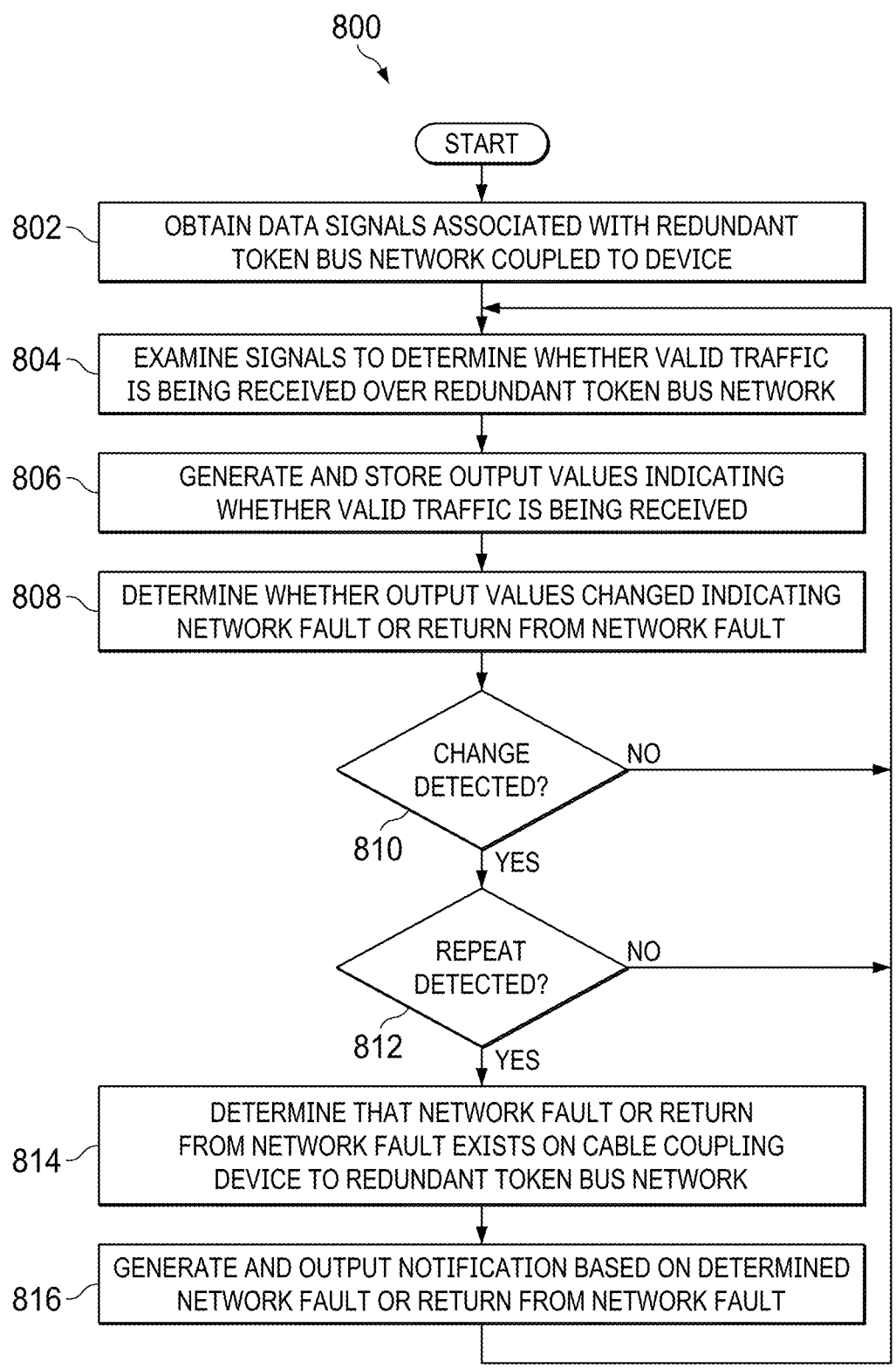
FIG. 8 illustrates an example method for detecting network problems on a redundant token bus control network according to this disclosure.

FIG. 8 illustrates an example method 800 for detecting network problems on a redundant token bus control network according to this disclosure. For ease of explanation, the method 800 is described as being performed using the fault detection architecture 500 of FIG. 5 with either of the network bridges 110a-110b of FIGS. 2 through 4 within the system 100 of FIG. 1. However, the method 800 could be performed using any suitable device and in any suitable system.

As shown in FIG. 8, data signals associated with a redundant token bus network coupled to a device are obtained at step 802. This could include, for example, the traffic detector 502 receiving the Data A and Data B signals from the media access units 210a-210b. The media access units 210a-210b could generate the data signals by digitizing signals received over the coaxial cables 212. The media access units 210a-210b could generate the digital data during periods when validity signals indicate that the media access units might be receiving valid data over the coaxial cables 212.

The data signals are examined to determine whether valid traffic is being received over the redundant token bus network at step 804. This could include, for example, the start-of-frame detectors 602a-602b examining the Data A and Data B signals and detecting any start-of-frame events within the signals. This could occur only when the validity signals from the control application 506 are asserted. This could also include the timer counter 604 counting any detected start-of-frame events for each data signal and determining whether at least a specified minimum number of start-of-frame events is detected within a given time period for each data signal.

Output values indicating whether valid traffic is being received are generated and stored at step 806. This could include, for example, the timer counter 604 generating a "1" bit value for each data signal where at least the specified minimum number of start-of-frame events were detected and a "0" bit value for each data signal where at least the specified minimum number of start-of-frame events were not detected. This could also include the traffic detector 502 storing the bit values in the traffic detector register 504.

A determination is made whether the output values have changed, thereby indicating at least one network fault or at least one return from a network fault, at step 808. This could include, for example, the processing device 406 executing the control application 506 to poll the traffic detector register 504 or otherwise obtain the bit values. This could also include the processing device 406 executing the control application 506 to determine whether any "0" bit values were recently generated by the traffic detector 502, where "1" bit values had previously been generated for the associated cable. This could further include the processing device 406 executing the control application 506 to determine whether any "1" bit values were recently generated by the traffic detector 502, where "0" bit values had previously been generated for the associated cable. If no changes are detected at step 810, the process returns to step 804 to continue processing the data signals. If at least one change is detected at step 810, a determination is made whether this is a repeat detection at step 812. This could include, for example, the processing device 406 executing the control application 506 to determine whether multiple consecutive "0" or "1" bit values were generated by the traffic detector 502. The control application 506 could require at least two consecutive "0" bit values associated with a single coaxial cable 212 be generated before treating the values as indicative of a network fault. Similarly, the control application 506 could require at least two consecutive "1" bit values associated with a single coaxial cable 212 be generated before treating the values as indicative of a return from a network fault. As noted above, this allows the control application 506 to de-bounce the bit values and ignore potential noise on the redundant token bus network. If no repeat detection has occurred, the process returns to step 804 to continue processing the data signals.

If one or more repeat detections have occurred, a determination is made that one or more network faults or one or more returns from network faults exist on one or more cables coupling the device to the redundant token bus network at step 814. This could include, for example, the processing device 406 executing the control application 506 to update one or more of the status values 508a-508b. In response, a suitable notification can be generated or updated and output at step 816. This could include, for example, the processing device 406 executing the user interface layer 510 to generate an alarm or warning that identifies the device and the cable or cables associated with the identified network fault(s) or clearing an alarm or warning associated with the identified return(s) from network fault(s). This could also include the processing device 406 executing the user interface layer 510 to generate a faceplate or other graphical user interface 700 that identifies the device and the cable or cables associated with the identified network fault(s) or that identifies the return(s) from network fault(s). Any other or additional notification(s) could be generated to inform one or more users of the network fault(s) or return(s) from network fault(s). In some embodiments, the notification or notifications could be sent to one or more users over a different control network.

Although FIG. 8 illustrates one example of a method 800 for detecting network problems on a redundant token bus control network, various changes may be made to FIG. 8. For example, while shown as a series of steps, various steps in FIG. 8 could overlap, occur in parallel, occur in a different order, or occur any number of times.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrases "at least one of" and "one or more of," when used with a list of items, mean that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
   an interface configured to obtain data associated with multiple cables coupled to or forming a part of a redundant token bus control network;
   a traffic detector configured to determine whether valid data traffic is being received over the cables from the redundant token bus control network based on the data;
   at least one processing device configured to determine whether one or more of the cables has experienced a network fault or a return from a network fault based on the determination of whether valid data traffic is being received over the cables; and
   wherein the at least one processing device is also configured, in response to determining that one or more of the cables has experienced a network fault or a return from a network fault, to generate a notification that identifies the apparatus and the one or more cables and output the notification, and
   wherein, to determine whether valid data traffic is being received over each of the cables from the redundant token bus control network, the traffic detector is configured to repeatedly:
      identify any start-of-frame events contained in the data associated with the cable;
      determine whether at least a specified number of start-of-frame events are identified during a specified time period;
      generate a first data value in response to determining that at least the specified number of start-of-frame events are identified during the specified time period; and
      generate a second data value in response to determining that at least the specified number of start-of-frame events are not identified during the specified time period.

2. The apparatus of claim 1, further comprising:
   at least one register configured to store the data values.

3. The apparatus of claim 2, wherein, to determine whether each of the cables is experiencing a network fault or a return from a network fault, the at least one processing device is configured to:
   retrieve multiple data values associated with the cable from the at least one register; and
   determine whether the data values change between the first and second data values.

4. The apparatus of claim 3, wherein, to determine whether each of the cables is experiencing a network fault or a return from a network fault, the at least one processing device is further configured to:
   de-bounce the multiple data values so that multiple consecutive second data values are required before identifying the network fault and multiple consecutive first data values are required before identifying the return from the network fault.

5. The apparatus of claim 1, further comprising:
   a second interface configured to obtain data associated with multiple cables coupled to or forming a part of a second control network different from the redundant token bus control network, wherein the second interface is configured to transmit the notification over the second control network.

6. The apparatus of claim 5, wherein:
   the cables coupled to or forming the part of the redundant token bus control network comprise coaxial cables; and
   the second control network comprises at least one Ethernet network.

7. The apparatus of claim 1, wherein the notification comprises a graphical user interface containing information about the apparatus, the information including a status of each of the cables.

8. The apparatus of claim 1, where the traffic detector comprises at least one of: a microprocessor, a microcontroller, a digital signal processor, a field programmable gate array, an application specific integrated circuit, and a discreet logic device.

9. A method comprising:
   obtaining, at a networked device, data associated with multiple cables coupled to or forming a part of a redundant token bus control network and data associated with multiple cables coupled to or forming a part of a second control network different from the redundant token bus control network;
   determining whether valid data traffic is being received over the cables from the redundant token bus control network based on the data;
   determining whether one or more of the cables has experienced a network fault or a return from a network fault based on the determination of whether valid data traffic is being received over the cables; and
   in response to determining that one or more of the cables has experienced a network fault or a return from a network fault, generating a notification that identifies the networked device and the one or more cables and outputting the notification,
   wherein determining whether valid data traffic is being received over the cables comprises, for each of the cables, repeatedly:
      identifying any start-of-frame events contained in the data associated with the cable;
      determining whether at least a specified number of start-of-frame events are identified during a specified time period;
      generating a first data value in response to determining that at least the specified number of start-of-frame events are identified during the specified time period; and
      generating a second data value in response to determining that at least the specified number of start-of-frame events are not identified during the specified time period.

10. The method of claim 9, further comprising:
    storing the data values for the cables in at least one register.

11. The method of claim 10, wherein determining whether the one or more cables has experienced a network fault or a return from a network fault comprises, for each of the cables:
  retrieving multiple data values associated with the cable from the at least one register; and
  determining whether the data values change between the first and second data values.

12. The method of claim 11, wherein determining whether the one or more cables has experienced a network fault or a return from a network fault further comprises, for each of the cables:
  de-bouncing the multiple data values so that multiple consecutive second data values are required before identifying the network fault and multiple consecutive first data values are required before identifying the return from the network fault.

13. The method of claim 9, further comprising:
  obtaining data associated with multiple cables coupled to or forming a part of a second control network different from the redundant token bus control network, wherein outputting the notification comprises transmitting the notification over a second control network.

14. The method of claim 9, wherein the notification comprises a graphical user interface containing information about the networked device, the information including a status of each of the cables.

15. The method of claim 9, wherein the notification comprises a warning or alarm identifying the networked device and the one or more cables experiencing the network fault.

16. A system comprising:
  a redundant set of networked devices, each networked device configured to be coupled to a redundant token bus control network;
  wherein each of the networked devices comprises:
    an interface configured to obtain data associated with multiple cables coupled to or forming a part of the redundant token bus control network;
    a second interface configured to transmit the notification over a second control network;
    a traffic detector configured to determine whether valid data traffic is being received over the cables from the redundant token bus control network based on the data; and
    at least one processing device configured to determine whether one or more of the cables has experienced a network fault or a return from a network fault based on the determination of whether valid data traffic is being received over the cables;
  wherein the at least one processing device is also configured, in response to determining that one or more of the cables has experienced a network fault or a return from a network fault, to generate a notification that identifies the networked device and the one or more cables and output the notification; and
  wherein each of the networked devices comprises a network bridge configured to perform message conversion, message forwarding, message filtering, and rate limiting in order to allow communication of information between devices coupled to the redundant token bus control network and devices coupled to the second control network.

* * * * *